June 23, 1964 G. BRUALDI 3,138,031

SPEED CHANGING MECHANISM

Filed Jan. 25, 1961 2 Sheets-Sheet 1

INVENTOR
GIORGIO BRUALDI
BY
William R. Liberman
ATTORNEY

INVENTOR
GIORGIO BRUALDI
BY
William R. Liberman
ATTORNEY

United States Patent Office 3,138,031
Patented June 23, 1964

3,138,031
SPEED CHANGING MECHANISM

Giorgio Brualdi, Milan, Italy, assignor to Lesa-Costruzioni Elettromeccaniche S.p.A., Milan, Italy, a corporation of Italy Filed Jan. 25, 1961, Ser. No. 84,872
Claims priority, application Italy Feb. 23, 1960
8 Claims. (Cl. 74—190)

The present invention relates generally to improvements in motion transmitting mechanisms and it relates particularly to an improved, variable speed drive mechanism for phonograph turntables and the like.

Specifically, the present invention is concerned with the type of phonograph turntable drive system in which a motor drives a stepped spindle or pulley having successively smaller coaxial cylindrical friction drive elements, the turntable includes a depending peripheral skirt, and an idler transmission wheel frictionally engages the spindle and turntable skirt to rotate the turntable upon rotation of the spindle. The idler wheel is transversely movable out of engagement with the stepped spindle and turntable skirt and is axially movable to different steps or levels of the drive spindle. Thus, the turntable speed is adjusted by retracting the transmission idler wheel from engagement with the spindle and turntable skirt axially moving the idler wheel to the desired step level and returning same into engagement with the drive spindle and turntable skirt the angular speed of the turntable being related to the ratio of the diameters of the engaged spindle step and the engaged surface of the turntable skirt.

In order to achieve faithful sound reproduction it is necessary that the phonograph turntable be constantly and uniformly driven at the predetermined speed. As a consequence the speed translating mechanism must uniformly and accurately transmit the drive spindle motion to the turntable at a fixed preselected ratio. To realize this result with the conventional variable speed turntable of the above type has been both difficult and expensive. The change speed systems heretofore available possess numerous drawbacks and disadvantages. They are very complex and generally employ a pair of mechanically related arrangements, the one for effecting the disengagement between the idler transmission wheel and the stepped spindle and turntable skirt, and the other to effect the axial shift of the transmission wheel. These separate mechanisms are actuated or manipulated by a single control member and must operate in sequence, the axial shifting being effected between the retraction and advance of the transmission wheel. In addition to its complexity, it is necessary that the various components and elements of the drive mechanism be constructed and machined of suitable materials to very close tolerances, and that they be very carefully interfitted, mated and assembled. Even if such is accomplished, these conventional drive mechanisms have been characterized by their frequent malfunctioning and defects, difficulty of maintenance and repair and they otherwise leave much to be desired.

It is, therefore, a principal object of the present invention to provide an improved variable speed drive mechanism.

Another object of the present invention is to provide an improved variable speed drive mechanism for phonograph turntables or the like.

Still another object of the present invention is to provide an improved turntable drive mechanism in which the turntable speed may be varied by a single control member.

A further object of the present invention is to provide an improved turntable variable speed drive mechanism of the above nature characterized by its simplicity, ruggedness, ease of operation, and low cost.

The above and other objects of the present invention will become apparent from a reading of the following description taken in conjunction with the accompanying drawings which illustrate a preferred embodiment of the present invention wherein.

Figure 1:
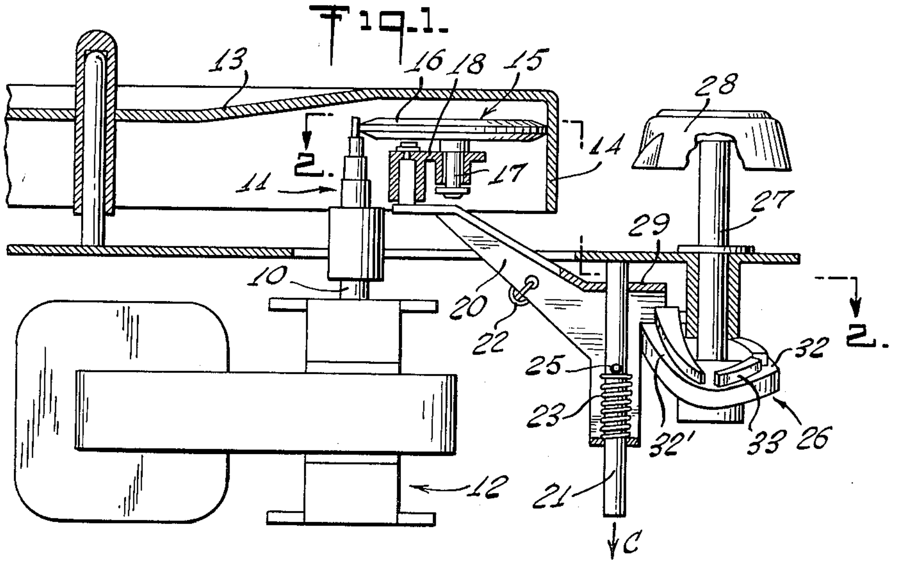
FIGURE 1 is a front fragmentary view, partially in section, of an improved variable speed drive mechanism embodying the present invention.

In a sense, the present invention contemplates a multiple speed drive mechanism of the character described comprising a stepped drive spindle, a cylindrical driven member rotatable about an axis parallel to the axis of said spindle, an axially movable shift lever rockable between an advanced and a retracted position, an idler transfer wheel mounted on said shift lever and transversely movable therewith into and out of engagement with said spindle and said driven member as said lever is in its advanced position and retracted position respectively and axially movable therewith to levels corresponding to that of the spindle steps, and a manually controlled selector member engaging said shift lever and provided with a first means for rocking said shift lever between its advanced and retracted positions and a second means for axially moving said shift lever upon retraction thereof from its advanced position.

According to a preferred form of the present invention, the drive spindle is driven by a constant speed electric motor and the driven member is defined by a turntable having a depending peripheral skirt. The shift lever is rockable about and slidably mounted on a vertical rod and includes a first arm which carries the transfer wheel and an oppositely directed short second arm and is spring urged downwardly and to its advanced spindle and skirt-engaging position. The selector member consists of a cylindrical cam member, the cammed end face of which engages the shift lever second arm to move it axially and is provided with a recessed circular track which likewise engages the second arm to rock the shift lever between its advanced and retracted position. When the shift lever second arm registers with a track recess it moves with the cam so that no axial movement is imparted thereto during its rocking motion.

Referring now to the drawings, which illustrate a preferred embodiment of the present invention which is employed for the control of the variation in transmission ratio between a drive shaft 10, provided at its upper end with a stepped pulley or spindle 11 driven by an electric motor 12, and the turntable 13, which in turn is provided with a depending peripheral skirt 14, the transmission being obtained by means of an intermediate idler transfer friction wheel 15 whose periphery 16 is covered with rubber or other material capable of insuring adhesion and noiseless transmission and which engages simultaneously the inner surface of the skirt 14 and one of the step sections of the spindle or pulley 11.

In order to permit the selective engagement of step sections of spindle 11 by friction wheel 15, the friction wheel 15 must be adjusted vertically and horizontally. Similarly, as is known, to permit the passage of said friction wheel 15 from one step to another on pulley 11, going from the part of smallest diameter to that of greatest diameter, the periphery 16 of said wheel must simultaneously be disengaged from said pulley.

For the above purpose, the friction wheel 15 is supported for free rotation, for example by means of a shaft 17 located at the free end of an arm 18 which in turn is oscillable, for example around a pin 19, perpendicular thereto and disposed on the end of an arm or lever 20 rotatable around a vertical axis constituted by a shaft 21. A resilient means, such as a spring 22, normally urges arm 20 in a clockwise direction as viewed in FIG. 2, so as to insure the simultaneous engagement of the transfer wheel 15 with pulley 11 and with skirt 14, the orientability of the small arm 18, in turn, insuring the automatic adaptation of said wheel 15 to the necessary position.

Figure 3:
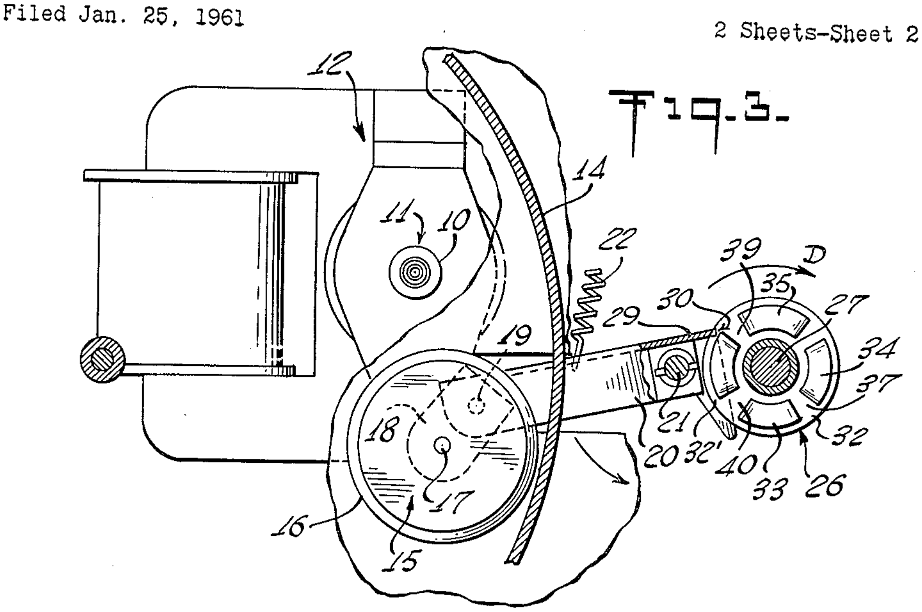
FIGURE 3 is a view similar to FIGURE 2, the idler transmission wheel being shown in its retracted position during a speed change sequence.

For the passage of the intermediate friction wheel 15 from a smaller step, or section of smaller diameter of the pulley 11, to any of the lower larger steps or sections of greater diameter, it is necessary that prior to the lowering of the wheel 15 to a level opposite the lower step, said intermediate wheel 15 must be moved away from driving pulley 11, and this is effected by rocking lever 20 counterclockwise around its shaft 21, counter to the action exerted by spring 22, to the position shown in FIG. 3. Upon retraction of wheel 15 from engagement with spindle 11 and skirt 14, the wheel must be lowered to a corresponding step level. This lowering action, stopped when wheel 15 reaches the level of the selected step of the pulley 11, must be followed by the return of said wheel into frictional engagement with spindle 11 and skirt 14 with displacement of arm 20 in a clockwise direction, which displacement is stopped by the opposition of the friction wheel with both parts 11 and 14 which it engages simultaneously.

According to a characteristic of the present invention, arm 20 is mounted for rotation as well as axial translation along and with respect to shaft 21, and is normally urged downward in direction by resilient means, such as a helical spring 23 which may, for example, be disposed around shaft 21, acting from the top down on the lower flange of lever 20 and reacting upward on a gudgeon pin 25, diametrically traversing the same shaft 21, the downward movement being opposed and regulated by the single control member 26.

Figures 4, 5:
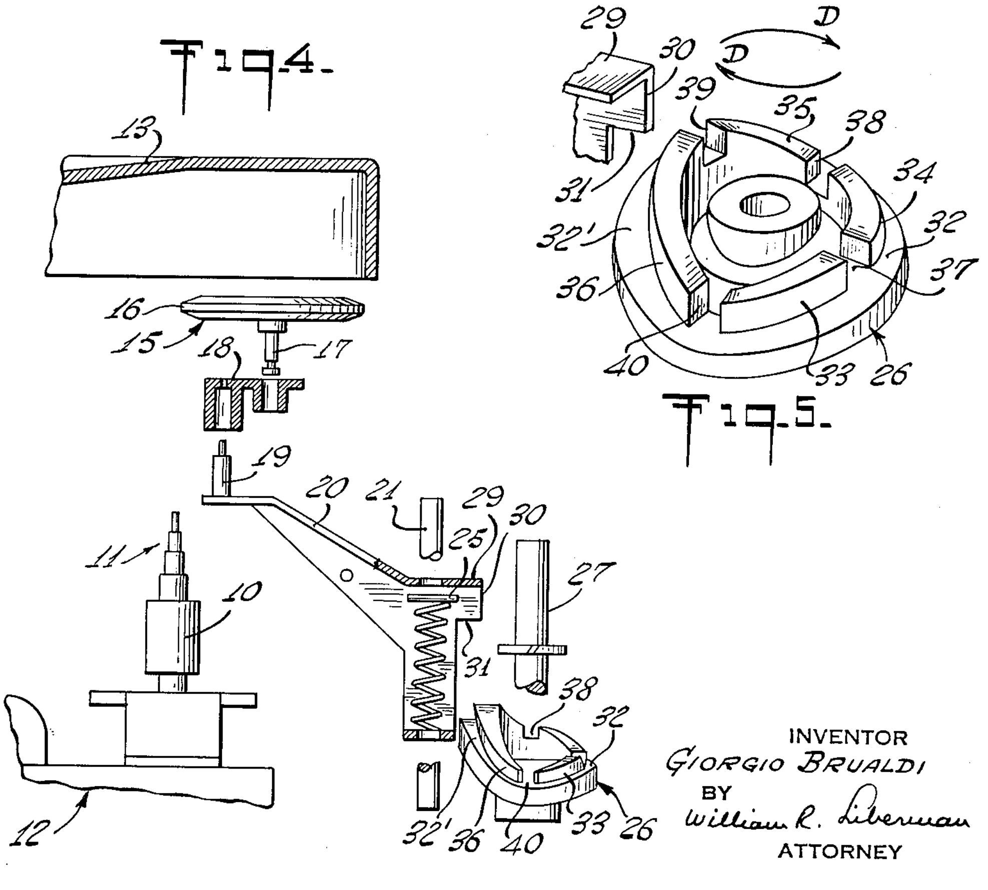
FIGURE 4 is a front fragmentary exploded view of the speed change mechanism.
FIGURE 5 is a perspective view of the change speed cam member and the associated shift arm shown in separated position.

The control member 26 is preferably constructed in the form of a complex cam, as best seen in FIG. 5, rotatable around the axis constituted by the shaft 27 to which the control member 26 is also fastened, and which is extended upward so that it can be fastened to a manipulating member for example, a button or knob 28, or equivalent gripping means, capable of being rotated by the user and brought to any of a plurality of positions identifiable by the necessary reference marks (not shown).

Said single control member 26, cooperates with the end of a short arm 29 of said lever 20, the function of the end of arm 29 and its cooperation with complex cam 26 being best seen in FIG. 5. The arm 29 terminates in a transversely offset vertical edge or surface 30, and a lower edge or surface 31 capable of slidably engaging with surfaces or tracks of radial action and, respectively, of axial action of said complex cam 26, to obtain the horizontal or transverse movements and, respectively, the vertical or axial displacements of arm 20 and consequently of intermediate friction wheel 15.

As can be seen by an examination of the drawings, in particular FIG. 5 thereof, complex cam 26 comprises a marginal cylindrical cam surface defining track 32 which, in plan, or in projection in a plane normal to the axis of the shaft 27, develops in the form of a circular ring, while in axial direction it develops as a cylindrical spiral for the prevalent fraction of its development, whose remaining fraction includes a section designated as 32', of steeper slope, as return part of said axial track or cam surface to its lower level.

Directly inside said marginal cylindrical cam surface

32, there is disposed a track of radial action, preferably of annular configuration, subdivided into sectors 33–36 by regularly spaced notches 37–40.

The complex cam 26 is disposed, with respect to arm 29 of lever 20, so that its lower sliding edge 31 rests slidably and constantly on the end marginal cam surface 32, while the lateral sliding edge 30 slides along the peripheral surface of the track 33–36 except when it is at any one of the notches 37–40.

It should be noted that the length of short arm 29 and the distance between shafts 21 and 27 constituting the axis of rotation of the arm 20 and of the complex cam 26, respectively, are such that whenever said lateral sliding edge 30 is in contact with one of the sectors 33–36, said arm 20 is urged counter clockwise to the position, shown in FIG. 3, of complete disengagement and substantial removal of intermediate friction wheel 15 from stepped driving pulley 11. When, on the other hand, edge 30 registers with any one of notches 37–40, as seen in FIG. 2, there is no opposition to the free return of arm 20 in a clockwise direction, under the return action exerted by spring 22, to the position of simultaneous frictional engagement with the inside of skirt 14 and with driving pulley 11.

Figure 2:
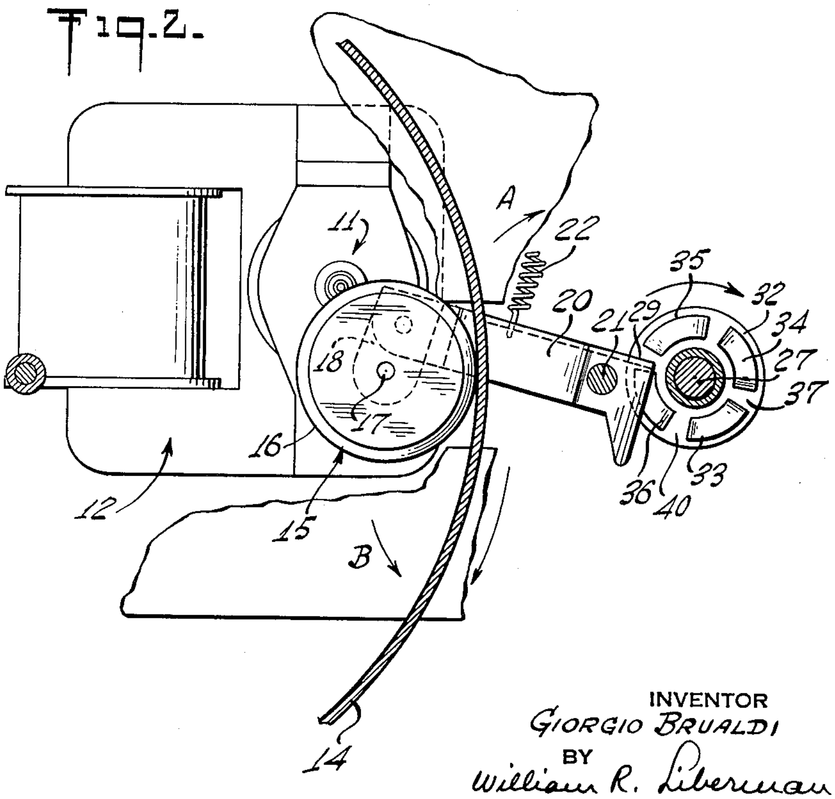
FIGURE 2 is a horizontal sectional view taken along the stepped line 2—2 in FIGURE 1.

It is apparent in view of the fact that the retraction or disengaging movement of the intermediate wheel 15 can be effected by rotation of lever 20 only in a counterclockwise direction, that complex cam 26 can be rotated only in a clockwise direction as seen in FIGS. 2, 3 and 5. In FIG. 3, is shown the position assumed by the lever 20 as the vertical sliding edge 30 completely emerges from one of the notches, for example notch 39. The aforesaid position is maintained until the next notch, in the present instance notch 40, reaches the edge 30 following the rotation of the complex cam 26, permitting the arm to return or advance to the position shown in FIG. 2, of engagement of the intermediate wheel 15, in its condition of frictional drive.

In the above described sequence, while the intermediate wheel 15 is retracted from pulley 11, the lower sliding edge 31 will travel the steep descending section 32' of the cam surface defining axial track of the complex cam, with corresponding downward movement of lever 20 and transport of friction wheel 15 from the level of the higher step to the level of the lower step of pulley 11.

During the subsequent increments of clockwise movement of the complex cam or selector member 26, the lower sliding edge 31 will be forced to travel the ascending spiral of the cam surface axial track 32, successively reaching the levels of the various overlying steps of pulley 11, while, as each respective level is reached, with one or another of notches 37–40 in front of the lateral sliding edge 30, the intermediate wheel 15 advances to its operating position, because arm 20, in those positions, will swing clockwise on shaft 21, under the influence of spring 22, and thereby cause wheel 15 to swing in the same direction against and into driving engagement with turntable skirt 14.

Since, however, the device in question has been described and represented only by way of indicative but not limitative example and only for the purpose of demonstrating its essential characteristics, the technical effects deriving from the application of the ideas of solution likewise set forth above, and of the main advantages of industrial production and service attainable with the practical embodiment of the invention, it must be understood that such a device may undergo modifications and variants in its merely structural particularities and in the specific technological solutions adoptable according to the particular conveniences and exigencies of manufacture, application of the device to turntables of various design, and service, all of which without departing from the scope of the present invention.

What is claimed is:

1. A multiple speed drive mechanism of the character described comprising a stepped drive spindle, a cylindrical driven member rotatable about an axis parallel to the axis of said spindle, an axially movable shift lever rockable between an advanced and a retracted position, an idler transfer wheel mounted on said shift lever and movable therewith into and out of engagement with said spindle and said driven member as said lever is in its advanced position and retracted position respectively and axially movable therewith to levels corresponding to that of the spindle steps, an arm projecting from and movable in unison with said lever, a rotatable cylindrical cam having an end face having a contour varying axially along a peripheral path engaging said arm to axially shift said arm upon relative movement between said end face and said arm, and a circumferentially extending upstanding track located on said cam end face inwardly of the periphery thereof and having recesses formed therein adapted to engage said arm.

2. A drive mechanism according to claim 1, including spring means resiliently axially urging said arm toward said cam end face.

3. A drive mechanism according to claim 1, including spring means normally urging said lever to its advanced engaged position.

4. A drive mechanism according to claim 1, including a swivel arm pivoted at one end to the free end of said lever and carrying at its opposite end said idler transfer wheel.

5. A device to obtain the variation and the passage from one to the other of different transmission ratios in record players or similar machines, in which the turntable is driven by a constant speed motor, directly operating on a motor pulley of the type known as step pulley by means of a friction idler wheel which engages at the same time any one of the motor pulley steps and a drum or the rim of the turntable, the passage of said idler wheel from one to the other of its positions of engagement with the various steps involving a movement of the horizontal plane of departure and a movement in a vertical direction of transport of said idler wheel from one to the other of the different levels of said steps, characterized by the fact that said idler wheel is supported by the extremity of an arm lever orientable around a vertical axis and displaceable in height along said axis, said lever engaging with, both in a radial and axial direction, a single control unit having a plurality of surfaces of different inclination in axial contact with said lever to effect the vertical displacement, and in radial contact with the unit at intersurface points to modify the orientation by disengagement of the idler wheel from the step pulley during passage from one step to another and restoring the orientation by re-engagement of the idler wheel to the pulley and drum or turntable rim when the arm reaches any one of the intersurfaces.

6. A device according to claim 5, characterized in that the single control unit consists of a complex cam with a 360° development and having a helicoidal surface developing in progressively upward inclining sections through the main portion of said 360° for the progressive transposition of the orientable arm from one to another of its levels and in a pronounced declination through the remaining section of said 360°, developing in said remaining section for the rapid return of said arm from one to the other of the extreme levels, notches in the cam between the several sections, the return positions of said orientable arm in the idler wheel-engaging position being distributed in said notches and the orientable arm being in idler wheel-disengaged position during movement of the arm along the several sections of the helicoidal surface of the cam between said notches.

7. A device according to claim 5, characterized by the fact that said single control consists of a complex cam having a working surface with axial action, constantly engaged with a portion of said orientable and vertically movable arm, said working surface developing in different levels in its circuit, and the working surface with a radial action able to enter in an intermittent contact with the same portion of said arm, compelling said arm to provoke the disengagement position of the idler wheel from the motor step pulley and intermittently permitting said arm to bring back the idler wheel to its working position, in locations where, under the action of said axial surface, said arm keeps said idler wheel at any of the working levels.

8. A device according to claim 7, characterized by the fact that said complex cam has also a marginal working surface having an annular surface with levels progressively variable, and a radial working surface, concentric to said marginal working surface, and divided into sectors separated by notches at the different points in which the particular level of said marginal working surface corresponds to one of the working levels of the idler wheel.

References Cited in the file of this patent

UNITED STATES PATENTS

| | | |
|---|---|---|
| 2,801,546 | Scheller et al. | Aug. 6, 1957 |
| 2,926,536 | Bradley | Mar. 1, 1960 |
| 2,951,386 | Edema | Sept. 6, 1960 |
| 2,956,440 | Schneider | Oct. 18, 1960 |
| 2,961,883 | Hartman | Nov. 29, 1960 |

FOREIGN PATENTS

| | | |
|---|---|---|
| 760,590 | Great Britain | Nov. 7, 1956 |
| 820,379 | Great Britain | Sept. 16, 1959 |